2,880,615

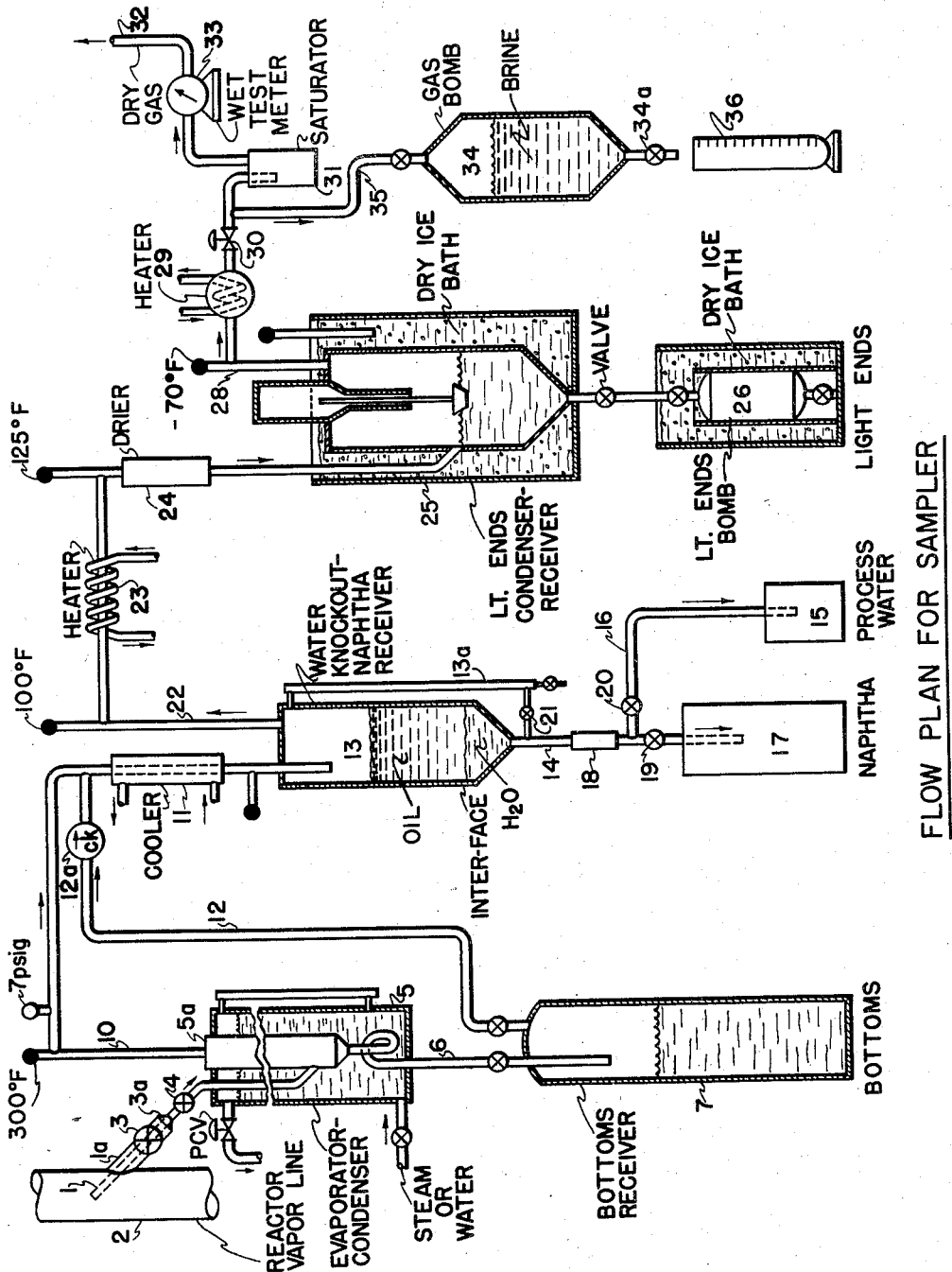

VAPOR SAMPLER

Robert L. Hardy, Harold A. Richards, Jr., and S. Whitney Downer III, Westfield, and Ray E. Olsen, Long Branch, N.J., assignors to Esso Research and Engineering Company, a corporation of Delaware Application November 30, 1954, Serial No. 472,052

1 Claim. (Cl. 73—422)

The present invention is concerned with an improved method of accurately and effectively determining the composition of the effluent stream from the reactor in a hydrocarbon cracking operation. The invention is more particularly concerned with a vapor sampler particularly adapted for the determination of the composition of the effluent cracked stream from a fluid catalytic cracking operation. The vapor sampler of the present invention comprises a probe for the removal of the sample from the outlet vapor conduit. The sample is an aliquot portion of the reactor vapor stream which may contain suspended solids. The sampler also comprises a first condensing stage which condenses products boiling above about 300° F. and removes the suspended solids; a second condensing stage which condenses normally liquid products boiling below about 300° F. and above 100° F. together with water; a vapor drying stage; a low temperature condensing stage; and means for measuring and sampling the gases not condensed in a third stage.

As pointed out heretofore, the sampler of the present invention is particularly adapted for use in conjunction with a cracking operation, particularly with a fluidized solids catalytic cracking process.

A fluidized solids catalytic cracking plant is composed of three sections: cracking, regeneration, and fractionation. The cracking reaction takes place continuously in a reactor at a temperature in the range from about 800° F. to 1050° F. The spent catalyst is removed continuously for regeneration in a separate regeneration vessel, from which it is returned to the cracking vessel, which is at a pressure below about 50 lbs., usually below about 20 lbs. per sq. in. Continuity of flow of catalysts as well as of oil is thus accomplished, and the characteristic features of fixed-bed designs involving the intermittent shifting of reactors through cracking, purging, and regeneration cycles are eliminated.

Regenerated catalyst is withdrawn from the regenerator and flows by gravity down a standpipe, wherein a sufficiently high pressure head is built up on the catalyst to allow its injection into the fresh liquid feed oil stream to the reactor. The resulting mixture of oil and catalyst flows into the reaction vessel, in which the gas velocity is intentionally low, so that a high concentration of catalyst will result in a dense catalyst phase. The cracking that takes place results in carbon deposition on the catalyst, requiring regeneration of the catalyst. The cracked product oil vapors are withdrawn from the top of the reactor after passing through cyclone separators to free them of most of the entrained catalyst particles, while the spent catalyst is withdrawn from the bottom of the reactor and is injected into a stream of undiluted air which carries the catalyst into the regeneration vessel. The products of combustion resulting from the regeneration of the catalyst leave the top of this vessel and passes through a series of cyclones where the bulk of the entrained catalyst is recovered. The regenerated catalyst is withdrawn from the bottom of the vessel to complete its cycle.

If a fluid cracking operation is to be operated at optimum conditions, it is essential to have an accurate knowledge of yield and composition of the cracked product. However, the sampling of the product from the reactor in the fluid type catalyst process presents particular difficulties and requirements. For instance, in a fluid catalyst cracking process the reactor overhead vapors, after removal of the majority of dilute phase catalyst loading by cyclone separation, are taken overhead at an elevated temperature (about 875° F. to 1000° F.) in completely vapor form to a conventional fractionator and light ends plant where the products are segregated. Yield distribution and quality of the various products are determined normally by special test procedures which are expensive and time consuming. Normal procedure involves sampling the various product streams, blending these streams in the laboratory in yield proportion based on plant meter readings, and back calculating yields at predetermined cutpoints made in the laboratory in standard distillation work-up procedure. This is a tedious and time-consuming task requiring multiple samples, distillations, and analyses, all tending to produce inaccuracies in the result. Results are not soon available after test period since yield-proportion blends for distillation must await preliminary yield material balance calculations to determine on output basis the relative weight or volume ratios of streams sampled in the plant test.

Furthermore, in a combination operation wherein the entire effluent from the reactor is passed to a product fractionator in which these vapors contact and strip a reduced crude of all constituents boiling up to about 1050° F. the above described method is not applicable, since the product fractionator serves to segregate a feed stream to the catalytic reactor which includes all of the recycle stock from the products boiling in the same range as the fresh feed, as well as to segregate cracked product streams from the reactor. It is impossible therefore to obtain a sample of that portion of the product boiling in the same range as the fresh feed. Furthermore, reaction products from other operations such as thermal reforming, visbreaking, etc. may be fractionated in the same tower so that the products removed from the combination fractionator are frequently mixtures of products from several processes. Thus, it becomes essential that the cracked products from the reactor be sampled directly from the reactor overhead line prior to entering the product fractionator.

Thus, the peculiar problems encountered in a fluidized catalytic cracking operation are as follows:

(1) A small but accurately representative aliquot must be obtained. For example, the usual requirement is to obtain about a 10 gallon sample (liquid) over a several hour sampling period which will be representative of perhaps 100,000 to 400,000 equivalent liquid gallons flowing as vapor through the line.

(2) The vapor flowing is a mixture of fixed gas, water vapor, and hydrocarbons varying in compositions from methane to heavy high boiling polymers.

(3) The vapor flowing usually contains some catalyst fines. It is important that catalyst, water (liquid) and high boiling liquid hydrocarbons (say 500° F.+material) are not condensed together since persistent emulsions result which are so difficult to break in the work-up procedure that losses occur and large inaccuracies result.

(4) The catalyst should necessarily be withdrawn with the sample rather than filtered out in the sampling device. Attempts to filter out catalyst may give rise to filtering surfaces which pass vapors non-uniformly or may build up catalyst cake which at the high temperature may give rise to further cracking during the sampling procedure. These situations would give results not accurately reflecting the true performance of the plant unit.

It has now been discovered that accurate results are secured by the sampler combination of the present invention. The apparatus of the present invention embodies a particular combination of principles to obtain the desired results. The present apparatus secures these results with simplicity, with a minimum number of process steps, with minimum controls and with minimum operator requirements.

In order to further appreciate the invention reference is made to the drawing illustrating one embodiment of the same. Referring specifically to the drawing, a probe 1 extends into the mid-point of the reactor overhead vapor line 2 and is angled about 40° to 50° to the direction of vapor flow. It is preferred to have the angle of the probe with respect to vapor flow at about 45°. The probe comprises an open end pipe section and the diameter of the probe is sized such that at the desired sampling rate the vapor velocity down the probe into the sampler is higher than in the reactor overhead line. This prevents any selective backmixing in the probe during the sampling. Normally reactor overhead vapor lines are designed such that gas linear velocities at average operating conditions are in the range of about 70–120 ft./sec. usually in the range of about 80–100 ft./sec. A suitable probe designed to collect a 10 gal. sample over a four hour period would for most cases be about a ⅛" diameter, schedule 80 pipe. Probe sizes for several conditions of operation are shown below:

*For transfer line velocity of about 90 ft. per sec.*

| Sample Size, Gal. | Sample Period, Hr. | Probe Size, Normal Pipe Diam., inches | Schedule |
|---|---|---|---|
| 10 | 4 | ⅛ | 40 |
| 20 | 4 | ¼ | 80 |
| 20 | 12 | ⅛ | 80 |

The probe tube itself usually consists of a pipe 1 ending in a valve 4. It enters the vapor line through a nozzle 1A which contains a gate valve 3 and a stuffing box 3A located on the side of valve 3 which is away from the vapor line. The stuffing box 3A is sized to form a vapor-tight seal with nozzle 1. When it is desired to obtain a sample the probe 1 is inserted into the stuffing box 3A with valve 3 closed. The stuffing box 3A is then tightened to form a vapor-tight seal with probe 1. With valve 4 closed valve 3 is then opened and probe 1 pushed through stuffing box 3A, valve 3 and nozzle 1A to its position in line 2. The downstream side of valve 4 may then be connected to the sampling device for withdrawal of the sample. By reversing the above procedure probe 1 may be withdrawn from line 2 after the sample has been taken to avoid damage by erosion caused by catalyst particles blowing in line 2.

The vapor sample passes through the probe and valve 4 and is passed into the first stage partial condenser 5. The temperature in condenser 5 is maintained in the range from about 280° F. to 320° F., preferably at about 300° F. The pressure is essentially that of the overhead reactor line 2 and is in the range from 7 to 20 p.s.i.g. Under these conditions a heavy hydrocarbon fraction is condensed in condenser 5. The liquid thus condensed together with uncondensed gas enters separator 5A where the liquid separates from the gas and is removed by means of line 6 and passed into a bottoms receiver 7. Entrained catalyst is removed in this first stage with the liquid and no emulsion is formed since no liquid water is present. This is important. The catalyst can be easily removed from the liquid later by means of filtration after the final distillation is effected (means not shown). The uncondensed fraction comprising lower boiling hydrocarbons and water is removed overhead from zone 5A by means of line 10 and passed through a condensing zone 11, which is maintained at a temperature in the range from about 90 to 110° F., preferably at about 100° F. Under these conditions the 100 to 300° F. hydrocarbon fraction and most of the water are condensed. Vapor constituents entering zone 7 and gas displaced by the entering liquid may be combined with this overhead fraction prior to second stage condenser 11 by means of line 12, which is equipped with a check valve 12A to prevent the backflow of vapors to zone 7. The liquid condensed in zone 11 together with uncondensed gas then enters receiver 13 which is equipped with a level gauge 13A installed such that both water and oil levels are indicated. Since the water and light hydrocarbons do not form an emulsion and since the catalyst has previously been removed the water-hydrocarbon phases readily separate and can be separately withdrawn from the unit at the end of the test by means of line 14. The water is passed to zone 15 by means of line 16 while the hydrocarbon is passed to zone 17. A sight glass 18 is located in line 14 so that all water may be drawn from receiver 13 prior to switching the liquid hydrocarbon to receiver 17. The operation is controlled by valves 19, 20 and 21.

The lower boiling hydrocarbons and equilibrium water is removed overhead from zone 13 by means of line 22 at about 100° F. The stream is heated in heating zone 23 to a temperature in the range of about 140 to 160° F., preferably about 150° F. This is necessary in order to insure that the water vapor is above its dewpoint at its existing partial pressure. The heated mixture is passed through a drying zone of suitable adsorbent material contained in drying zone 24. The adsorbent material such as dehydrated calcium sulfate must have a high selectivity and capacity for water removal with extremely low selectivity and capacity for the removal of hydrocarbons. The thoroughly dry vapor is passed to a third stage condensing zone 25 which comprises a low temperature partial condenser capable of condensing essentially all of the butane to 100° F. hydrocarbon fraction together with some lighter fractions. Normal operating conditions of this third operational condensing stage is in the range of from about +10° F. to —70° F. Increasing amounts of light hydrocarbon gas components can be removed by providing lower temperatures. The successful operation at this stage depends upon the absence of icing provided by the intermediate drying zone 24. The liquid product is passed into a cold pressure bomb 26 which may be disconnected from the unit and which may serve as a storage container for the highly volatile liquid until it is analyzed. Bomb 26 is equipped with an outlet on each end so that the contained liquid may be removed.

The residual gas fraction is removed from tertiary stage 25 by means of line 28, heated to ambient temperature in zone 29. It then passes through control valve 30 which is regulated to control the rate of sampling from reactor vapor line 2. Since the residual gas production is known approximately, a convenient way of regulating the rate of sampling is to establish the escape of gas as measured by wet test meter 33 at a predetermined level. The gas passing through valve 30 is sampled for analysis through line 35. This may be done by several known means to obtain sample representation of the gas flowing through line 28 throughout the test. The method illustrated shows the gas being collected in gas bomb 34 by displacement of brine with the rate being maintained at a predetermined rate (to just fill the bomb completely during the duration of the test period) by measuring the rate of brine displacement through needle valve 34A by means of graduated vessel 36. The stream of gas flowing in line 28 is passed through water saturator 31 to bring it to equilibrium moisture content and then is measured by wet test meter 33 and vented to the atmosphere through line 32.

What is claimed is:

An apparatus for sampling an effluent cracked vaporous hydrocarbon stream passing through an outlet conduit at a velocity between about 70 and 120 feet per second and at a temperature between about 875° F. and 1000° F. from a reactor vessel in a fluidized solids catalytic cracking system and wherein said effluent vaporous hydrocarbon stream contains water vapor and suspended catalyst fines not removed by cyclone separators in said reactor vessel and wherein a persistent emulsion is formed if the effluent vaporous hydrocarbon stream is initially cooled sufficiently low to condense water, which includes nozzle means communicating with said outlet conduit and arranged at an angle thereto, a tubular probe having an outlet end and an inlet end adapted for removable insertion angularly upward through said nozzle means and in fluid tight relation thereto and adapted to be inserted into said outlet conduit at an angle of about 45° to the direction of flow of the vaporous hydrocarbon stream through said outlet conduit and to extend into the midpoint of said outlet conduit, said probe being adapted to withdraw a representative portion of the cracked vaporous hydrocarbon stream passing through said outlet conduit at selected time intervals and being adapted to be withdrawn from said outlet conduit when no sample is to be taken to avoid erosion of said probe, an initial condensing unit communicating with the other end of said probe and adapted to cool the effluent vaporous hydrocarbon stream to a temperature between about 280° F. and 320° F. to condense only a heavy hydrocarbon fraction to scrub out the catalyst fines from the effluent hydrocarbon vaporous stream and form a hydrocarbon oil slurry, said initial condenser unit including a receiver for said hydrocarbon oil slurry containing the scrubbed out catalyst fines, and means for separating and collecting separate liquid and gaseous fractions from the vaporous hydrocarbon stream leaving said initial condensing unit.

References Cited in the file of this patent

UNITED STATES PATENTS

| | | |
|---|---|---|
| 1,984,686 | Mather et al. | Dec. 18, 1934 |
| 2,212,681 | Dunn | Aug. 27, 1940 |
| 2,287,101 | Horvitz | June 23, 1942 |
| 2,306,606 | Hirsch | Dec. 29, 1942 |
| 2,516,097 | Woodham et al. | July 18, 1950 |
| 2,698,672 | Burnside et al. | Jan. 4, 1955 |

FOREIGN PATENTS

| | | |
|---|---|---|
| 239,208 | Great Britain | Jan. 21, 1926 |

UNITED STATES PATENT OFFICE

CERTIFICATE OF CORRECTION

Patent No. 2,880,615                                      April 7, 1959

Robert L. Hardy et al.

It is hereby certified that error appears in the above numbered patent requiring correction and that the said Letters Patent should Letters Patent should read as corrected below.

In the grant, line 1, and in the heading to the printed specification, line 1, name of second inventor, for "Harold A. Richards, Jr." read -- Harold A. Ricards, Jr. --.

Signed and sealed this 18th day of August 1959.

(SEAL)

Attest:

KARL H. AXLINE                                            ROBERT C. WATSON
Attesting Officer                                    Commissioner of Patents